(12) United States Patent
Bentz

(10) Patent No.: US 10,638,762 B2
(45) Date of Patent: May 5, 2020

(54) DAMPER POSITIONING SYSTEM FOR AN OVEN

(71) Applicant: Fusion Tech Integrated, Inc., Roseville, IL (US)

(72) Inventor: Brandon Bentz, Roseville, IL (US)

(73) Assignee: FUSION TECH INTEGRATED, INC., Roseville, IL (US)

( * ) Notice: Subject to any disclaimer, the term of this patent is extended or adjusted under 35 U.S.C. 154(b) by 0 days.

(21) Appl. No.: 15/288,258

(22) Filed: Oct. 7, 2016

(65) Prior Publication Data

US 2018/0098545 A1  Apr. 12, 2018

(51) Int. Cl.
*A21B 1/26* (2006.01)
*A21B 1/40* (2006.01)

(52) U.S. Cl.
CPC . *A21B 1/26* (2013.01); *A21B 1/40* (2013.01)

(58) Field of Classification Search
CPC .................................... A21B 1/26; A21B 1/40
USPC .................................. 99/480, 476, 474, 473
See application file for complete search history.

(56) References Cited

U.S. PATENT DOCUMENTS

| | | | | |
|---|---|---|---|---|
| 2,119,455 A * | 5/1938 | De Ayala | ............. | H05B 1/0225 126/275 E |
| 2,625,095 A * | 1/1953 | Julian | .................... | A23B 4/052 99/476 |
| 2,780,182 A * | 2/1957 | Rand | ....................... | A21B 1/46 99/353 |
| 3,589,269 A * | 6/1971 | Weir, Sr. | ................. | A47J 37/06 99/332 |
| 3,943,842 A * | 3/1976 | Bills | ....................... | A23L 3/00 99/473 |
| 4,753,215 A * | 6/1988 | Kaminski | ............. | A21B 1/245 126/21 A |
| 4,817,582 A * | 4/1989 | Oslin | ....................... | A21B 1/24 126/20 |
| 5,240,320 A * | 8/1993 | Yerman | .................. | A47B 57/52 312/236 |
| 5,671,660 A * | 9/1997 | Moshonas | ............. | A21B 1/245 126/21 A |
| 5,801,362 A * | 9/1998 | Pearlman | ........... | A47J 37/0623 126/21 A |
| 5,937,845 A * | 8/1999 | Gladd, Sr. | ................ | A21B 1/26 126/21 A |
| 6,539,934 B2 * | 4/2003 | Moshonas | ............. | A21B 1/245 126/21 A |
| 6,592,364 B2 * | 7/2003 | Zapata | ..................... | F27B 9/10 126/21 A |
| 7,055,518 B2 * | 6/2006 | McFadden | ............ | A21B 1/245 126/21 A |
| 8,839,714 B2 * | 9/2014 | Schjerven, Sr. | ....... | A21B 1/245 126/21 A |

(Continued)

OTHER PUBLICATIONS

European Extended Search Report, "Communication Pursuant to Rule 62 EPC" from European Patent Office in Munich, Germany, for European Application No. 17194968.8, dated Feb. 28, 2018, 8 pages.

*Primary Examiner* — Ibrahmie A Abraham
*Assistant Examiner* — Frederick F Calvetti
(74) *Attorney, Agent, or Firm* — Zarley Law Firm, PLC

(57) ABSTRACT

A damper positioning system where dampers for an oven are selectively positioned to provide air flow to a cooking chamber zone for a pre-selected period of time based upon a pre-programmed cooking process.

5 Claims, 3 Drawing Sheets

(56) References Cited

U.S. PATENT DOCUMENTS

| | | | | |
|---|---|---|---|---|
| 2006/0169272 | A1* | 8/2006 | McFadden | A21B 1/245 126/21 A |
| 2007/0006865 | A1* | 1/2007 | Wiker | A21B 1/245 126/21 A |
| 2008/0202350 | A1* | 8/2008 | Maki | A21B 1/26 99/330 |
| 2011/0005409 | A1* | 1/2011 | Majchrzak | A47J 36/2483 99/468 |
| 2011/0048245 | A1* | 3/2011 | Schjerven, Sr. | A21B 1/245 99/331 |
| 2013/0133637 | A1* | 5/2013 | McVeagh | A21B 1/26 126/15 R |
| 2015/0059595 | A1* | 3/2015 | Rand | F24C 15/322 99/468 |
| 2016/0215989 | A1* | 7/2016 | Buller-Colthurst | A21B 1/26 |
| 2016/0356504 | A1* | 12/2016 | McKee | F24C 15/322 |
| 2016/0356505 | A1* | 12/2016 | McKee | F24C 15/322 |
| 2017/0016624 | A1* | 1/2017 | McVeagh | A21B 1/26 |
| 2017/0211819 | A1* | 7/2017 | McKee | F24C 15/322 |

* cited by examiner

DAMPER POSITIONING SYSTEM FOR AN OVEN

BACKGROUND OF THE INVENTION

This invention is directed to a system of controlling a cooking process of a commercial oven, and more particularly to a system for controlling the position of the dampers within an oven.

Large commercial batch ovens or smokehouses cabinets are well-known in the art for cooking food products for extended predetermined periods of time to accomplish desired levels of cooking, smoking, and moisture content. Large cooking chambers have difficulty accommodating food products having different cooking temperatures.

Therefore, a need exists in the art for a device that addresses these deficiencies.

An objective of the present invention is to provide a damper positioning invention system that permits airflow dwell time.

A further objective of the present invention is to provide a damper positioning system that eliminates hot spots and cold spots.

A still further objective of the present invention is to provide a damper positioning system wherein zones within an oven are selectably activated.

These and other objectives will be apparent to one of ordinary skill in the art based upon the following written description, drawings, and claims.

SUMMARY OF THE INVENTION

A damper positioning system for use with an oven having a heated air chamber positioned above and in communication with a cooking chamber. Disposed within the heated air chamber are a pair of dampers that are positioned at 90° in relation to the other dampers.

The dampers are connected to a shaft that is rotatably driven by motor. The shaft extends from the motor, through a plurality of dials and switches, and into the heated air chamber. The dials and switches are connected to a computer and each dial and switch corresponds to a zone within the cooking chamber.

Based upon a pre-programmed cooking process, the computer sends a signal to activate a specific dial and switch. Once activated, the dial and switch controls the motor to rotate the shaft and dampers to a position that permits heated air to flow into the heating chamber to a breakpoint location associated with a cooking zone.

The computer can also be connected or not connected to one or more sensors positioned within the cooking chamber. Based upon information provided by the sensors the computer may send signals to the dials and switches overriding the pre-programmed cooking process.

DETAILED DESCRIPTION OF THE PREFERRED EMBODIMENT

Figure 1:
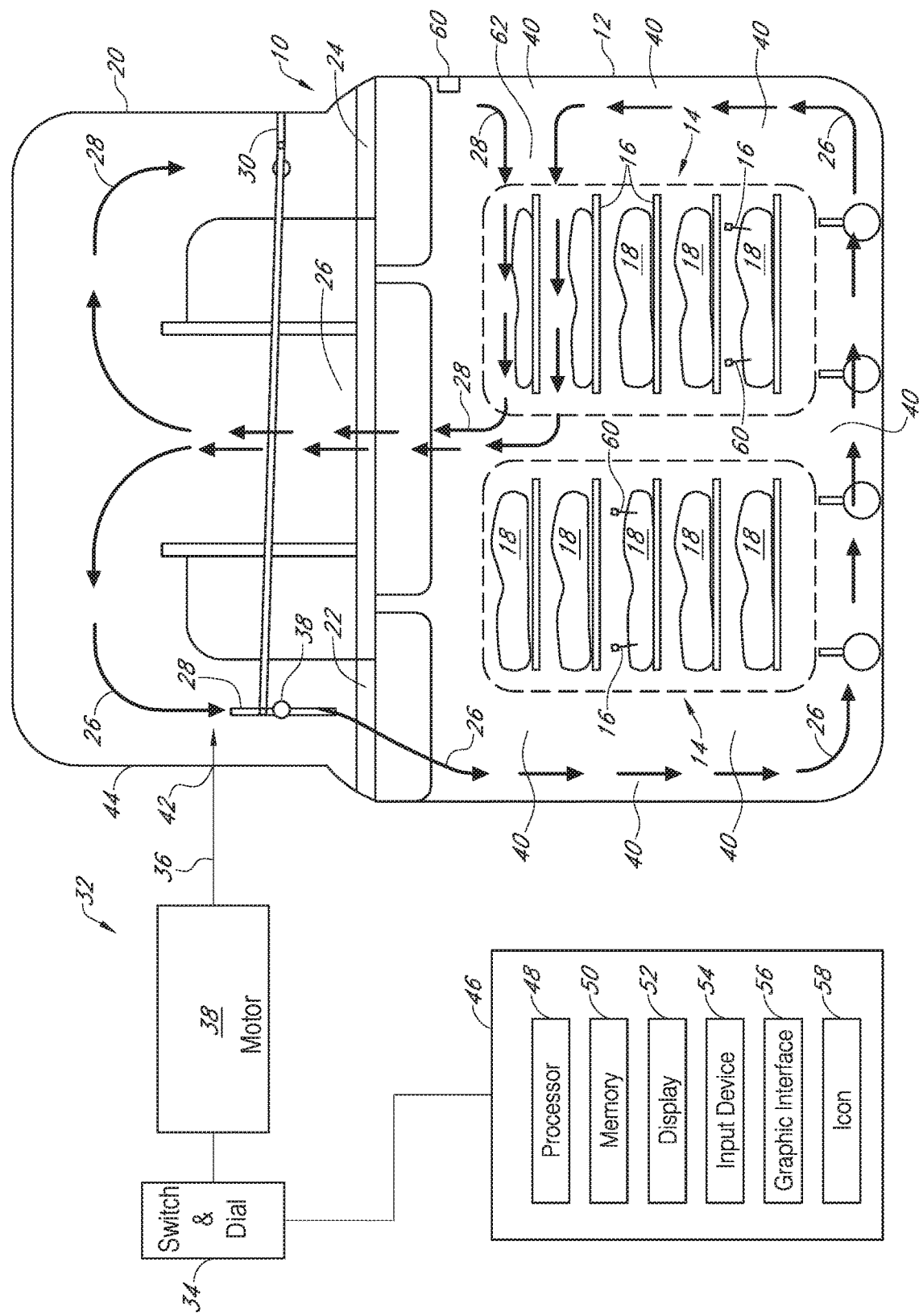
FIG. 1 is a sectional schematic view of an oven with a damper positioning system.
Figure 2:
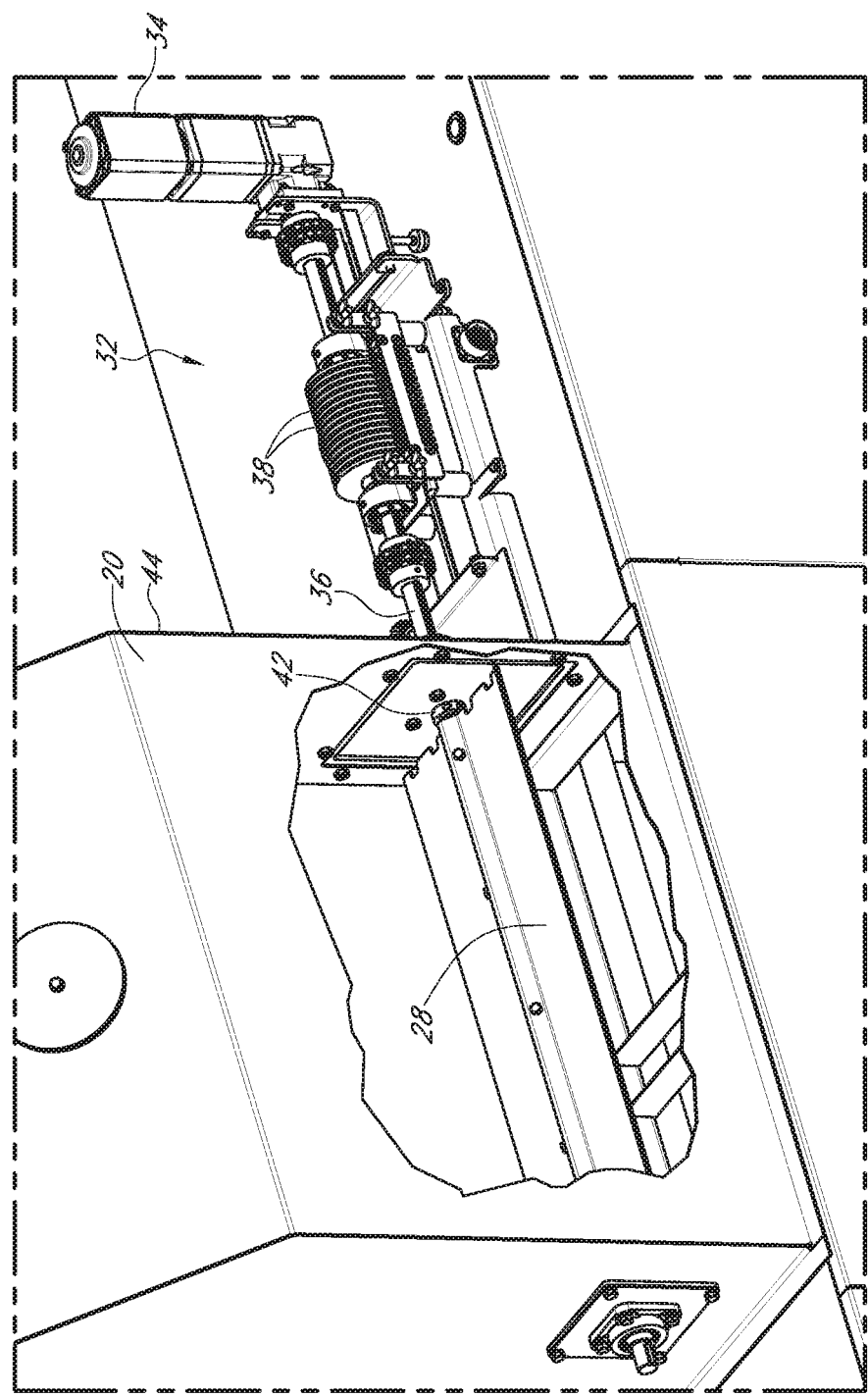
FIG. 2 is a perspective view of an oven with a damper positioning system.
Figure 3:
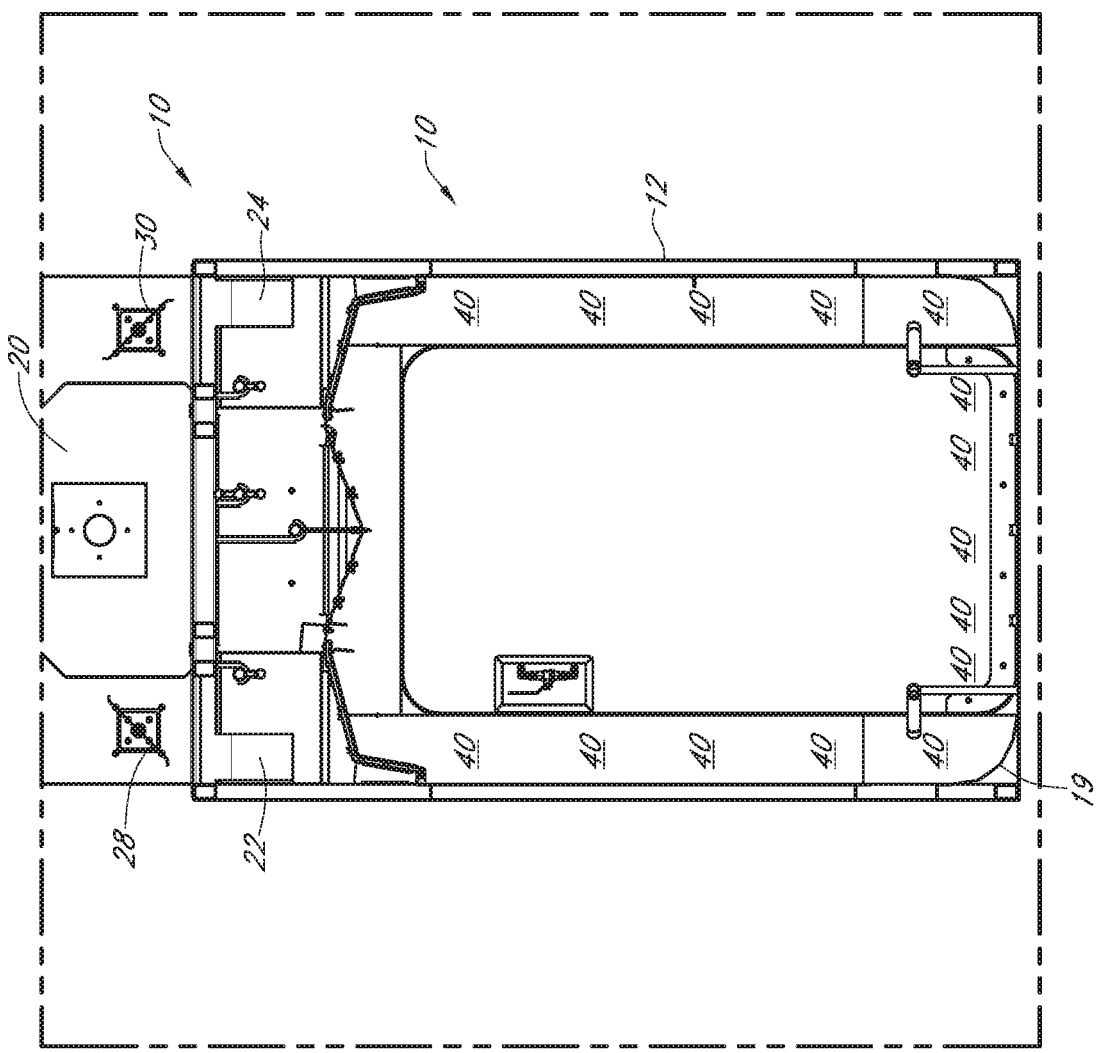
FIG. 3 is a front view of an oven.

Referring to the Figures, an oven 10 includes a cooking chamber 12. Disposed within the cooking chamber 12 is a removable rack 14 having a plurality of trays 16. Various food products 18 are placed on the trays for cooking, smoking, or dehydration. The bottom corners 19 of the cooking chamber 12 have a cove radius along the walls to maintain airflow velocities, prevent overheating of product on a bottom portion of the rack 14, and allow airflow to pass properly under the racks 14.

Positioned above the cooking chamber 12 is a heated air chamber 20. The heated air chamber 20 has a first air duct 22 and a second air duct 24 in communication with the cooking chamber 12. The heated air chamber 20 also has an exhaust duct 26. Positioned in association with the first and second ducts 22 and 24 are first and second dampers 28 and 30. The first and second dampers 28 and 30 are positioned to have opposite orientations. For example, when the first damper 28 is in a vertical position the second damper 30 is in a horizontal position and vice versa.

Each damper 28 and 30 is connected to and operated by a damper positioning system 32. The damper positioning system 32 includes a motor 34 connected to a drive shaft 36 preferably with right angle gearing. The drive shaft 36 extends through a plurality of dials and switches 38. Preferably there are fifteen dials and switches 38 with each dial and switch 38 associated with a zone 40 within the cooking chamber 12. From the dials and switches 38 the drive shaft 36 extends through an opening 42 in a wall 44 of the heated air chamber 20 where the shaft 36 is connected to the damper.

The plurality of dials and switches 38 are connected to a computer 46 having a processor 48, memory 50, display 52, and input device 54. The display 52 and/or input device 54 are of any type and preferably is a touch screen having a graphic interface 56 of the oven where an icon 58 may be clicked and moved on the interface 56. The computer 46 is connected to one or more sensors 60 disposed within the cooking chamber 12 to sense operating conditions including but not limited to cooking chamber temperature, airflow rate, humidity, internal product temperature, and the like.

In operation, food product 18 is placed on trays 16 that are placed on racks 14. The racks 14 are then placed within the cooking chamber 12.

Once positioned, an operator selects a pre-programmed cooking process or recipe depending upon the food product type and the desired result. The pre-programmed cooking processes are stored in memory 50 and are selected and activated through the input device 54.

Once activated the computer sends signals to the dials and switches 38 that correspond with the selected cooking process/recipe. When activated, the selected dial and switch 38 controls the motor 34 such that shaft 36 rotates causing the dampers 28 and 30 to move to a desired position. Based upon the position of the dampers 28 and 30 hot air flows through ducts 22 and 24 along an outer wall of cooking chamber until the airflow reaches a breakpoint location 62 where airflow equalizes. At the breakpoint location 62, airflow is directed inwardly toward the center of the cooking chamber and then upwardly through the exhaust duct 26 and into the heated air chamber 20. The dampers 28 and 30 are held in a desired position for a predetermined length of time based upon the cooking process or recipe. Once the predetermined length of time has expired, the computer 46 sends a signal activating another dial and switch 38. The activated dial and switch 38 controls motor 34 to rotating shaft 36 and move dampers 28 and 30 to a new position that directs airflow to a breakpoint location 62 associated with a specific zone 40 within the cooking chamber. This continues until the cooking process or recipe is completed.

Each dial and switch 38 activates and controls the motor 34. The dial and switch 38 activated by the computer 46 is associated with a position of the dampers 28 and 30 that communicate airflow to a desired zone. Thus, each zone 40 corresponds to a different dial and switch 38. The motor 34 stops for a period of time based on the recipe and/or input from the sensors 60 to provide airflow dwell time.

Thus a damper positioning system for an oven has been disclosed that, at the very least, meets all the stated objectives.

What is claimed:

1. A damper positioning system, comprising:
    an oven having a heated air chamber positioned above and in communication with a cooking chamber;
    a pair of dampers disposed within the heated air chamber with each damper connected to a drive shaft rotatably driven by a motor;
    wherein at least one of the drive shafts extend through a plurality of dials and switches;
    a computer connected to and configured to detect and control the movement of the plurality of dials and switches that control the motor to move the dampers to a preselected position for a preselected length of time based upon a predefined cooking process associated with cooking requirements of a food product; and
    wherein each dial and switch corresponds to a zone within the cooking chamber and controls the motor to rotate at least one of the drive shafts and pair of dampers to a position that permits heated air flow into the heating chamber to a breakpoint location associated with a cooking zone.

2. The damper positioning system of claim 1 wherein bottom corners of the cooking chamber have a cove radius.

3. The damper positioning system of claim 1 wherein a first and second damper of the pair of dampers are positioned to have opposite orientations.

4. A damper positioning system, comprising:
    an oven having a heated air chamber positioned above and in communication with a cooking chamber;
    a pair of dampers disposed within the heated air chamber with each damper connected to a drive shaft rotatably driven by a motor;
    wherein at least one of the drive shafts extend through a plurality of dials and switches;
    a plurality of dials and switches that control the motor to move the dampers to a predetermined position for a preselected length of time based upon a predefined cooking process associated with cooking requirements of a food product; and
    wherein each dial and switch corresponds to a zone within the cooking chamber.

5. A damper positioning system, comprising:
    an oven having a heated air chamber positioned above and in communication with a cooking chamber;
    a pair of dampers disposed within the heated air chamber with each damper connected to a drive shaft rotatably driven by a motor;
    wherein at least one of the drive shafts extend through a plurality of dials and switches; and
    a computer connected to and configured to detect and control the movement of the plurality of dials and switches that control the motor to move the dampers to a predetermined position for a predetermined length of time based on a selected cooking processes, wherein the cooking process is predefined prior to the start of cooking.

* * * * *